3,194,268
VALVE
Reno L. Vicenzi and John A. Kleinheinz, Riverside, Calif., assignors to Controls Company of America, Schiller Park, Ill., a corporation of Delaware
Filed Jan. 31, 1962, Ser. No. 170,042
9 Claims. (Cl. 137—614.11)

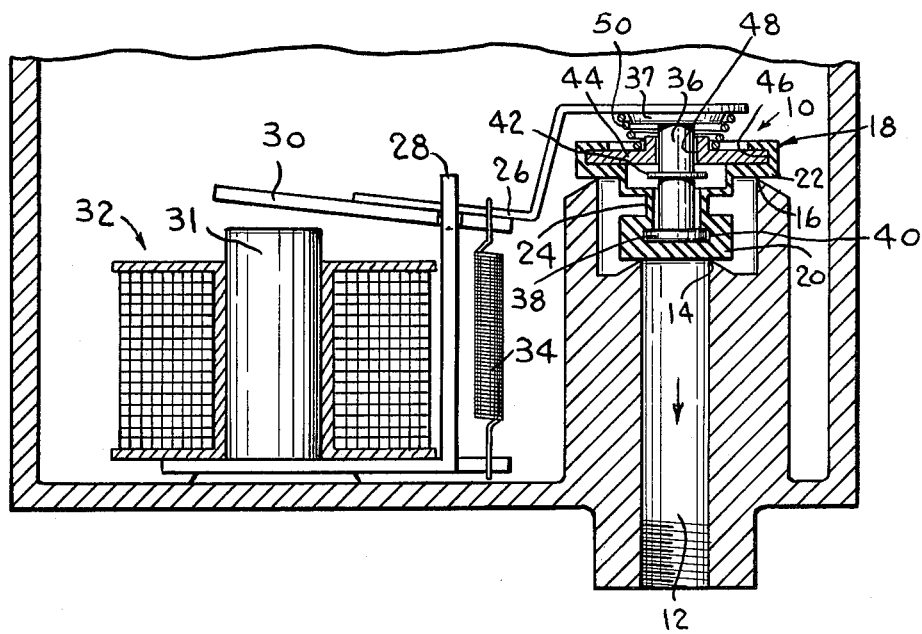
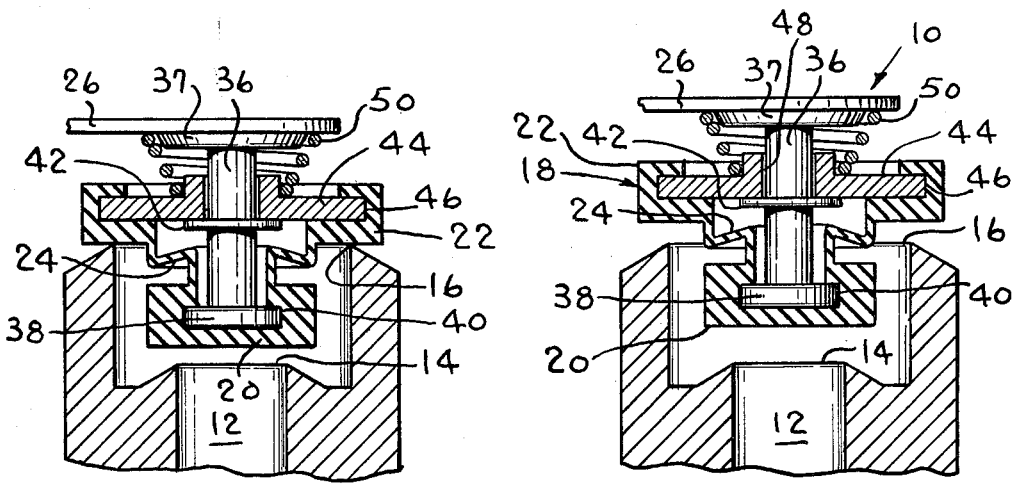

This invention relates to a gas valve.

Gas valves are susceptible to the deposit and build up of foreign materials, which may be carried in the gas line, which prevent tight shut-off and results in leakage when the valve is in its closed position.

An object of this invention is to provide a valve which is simply constructed and will establish a safe and dependable seal.

Another object of this invention is to provide a valve which will establish a double seal in a single passageway.

For the achievement of these objects this invention contemplates a valve arrangement including two relatively movable valves which are serially spaced and are interconnected by a flexible sealing membrane.

The novel features of this invention are set forth in the appended claims. The invention itself, together with additional objects and advantages thereof will be more clearly understood from a reading of the following description in connection with the accompanying drawings wherein a preferred embodiment of this invention is illustrated and in which:

FIG. 1 is a sectional view of the valve in its closed position;

FIG. 2 is a sectional view of the valve in a partially open, or closed position; and FIG. 3 is a sectional view of the valve in its open position.

The valve mechanism 10 is positioned in the end of outlet passage 12 which includes a first valve seat 14 and a second valve seat 16 concentrically arranged relative to seat 14. Valve seats 14 and 16 are relatively spaced along or serially arranged in passage 12.

Valve mechanism 10 also includes a one piece body portion 18, preferably of molded rubber, which includes first and second resilient valve disks 20 and 22. A thin flexible membrane 24 sealingly connects valve disks 20 and 22 and also provides for relative movement therebetween for a purpose which will appear hereinafter.

Body portion 18 is movable into and out of the opening of passageway 12 by means of a lever 26 which is pivoted on bracket 28 and has an end 30 positioned adjacent core 31 of electromagnet 32. Energization of electromagnet 32 attracts arm 30 to pivot lever 26 to open the valves. Lever 26 is biased in the valve closing direction by tension spring 34. Valve stem 36 has a circular member 37 at its upper end which is connected to lever 26 and also has a lower flanged end portion 38 engaged in groove 40 inside the lower valve disk 20.

Shoulder 42 is provided on valve stem 36 and is positioned intermediate valve disks 20 and 22. When the valve disks are in engagement with their respective seats, projection 42 is normally spaced from plate 44 which is engaged inside groove 46 in valve disk 22. Stem 36 is movable through an aperture 48 in plate 44. Compression spring 50 is positioned by member 37 and seated between lever 26 and plate 44 to bias valve disk 22 toward shoulder 42.

As can be seen in FIG. 2, upon initial movement of lever 26 away from passageway 12, valve disk 20 is moved out of engagement with its valve seat 14. Stem 36 moves relative to plate 44, and correspondingly valve disk 22, for the initial portion of the travel of the stem. This movement of stem 36 moves shoulder 42 into engagement with plate 44 subsequent to dis-engagement of valve disk 20 from its valve seat and further travel of lever 26 disengages valve disk 22 from its valve seat 16. When valve disk 22 is moved from its valve seat compression spring 50 maintains engagement between plate 44 and shoulder 42. It can thus be seen that disengagement of the valve disks from their respective valve seats occurs sequentially upon actuation of lever 26 and that flexible membrane 24 permits relative movement between the valve disks while maintaining a sealed connection therebetween.

When the electromagnet is de-energized spring 34 moves the lever 26 in a closing direction to seat disk 22 first and, since spring 34 is stronger than spring 50, the lever continues in a downward direction to seat disk 20. Spring 50 determines the seating force on disk 22 and the effective difference between springs 34 and 50 determines the seating force on disk 20.

Accordingly two positive valve seals are provided in series to thereby increase the dependability of the valve seal by insuring that should one valve seat become fouled to prevent a proper seal another remains to provide a safe and dependable seal, which is particularly desirable where the valve is handling hazardous gases. Further, valve disks 20 and 22 are relatively movable and sequentially opened and closed to insure tight engagement and positive shut-off by both valve disks. Furthermore, it should be noted that membrane 22 provides a completely sealed connection between the valve disks and around stem 36 so that no leakage can occur to or from the stem area and also provides a flexible connection to permit relative movement between the valve disks.

The description of this invention with reference to a particular preferred embodiment thereof has been intended for illustrative purposes only and should not be taken by way of limitation. Accordingly, it is intended in the appended claims to cover all modifications and embodiments of this invention as fall within the true spirit and scope thereof.

What we claim is:

1. A valve for sealing a passageway comprising, in combination, a pair of relatively spaced valve seats in said passageway, a body portion including first and second relatively spaced resilient valve disks and a flexible membrane sealingly connecting said first and second valve disks, and operating means for moving said body portion toward and away from said valve seats, said operating means including a valve stem in said body portion and connected to and movable jointly with said first valve disk and shoulder means on said valve stem arranged intermediate said first and second disks, and means biasing said shoulder means and said second valve disk into engagement and, when said shoulder means is engaged with said second valve disk, said first and second valve disk being spaced apart a distance less than the distance between said valve seats and arranged so that said second valve disk is the first to engage its valve seat and said valve stem continues to move said second valve disk into engagement with its valve seat independently of movement of said second valve disk.

2. The valve of claim 1 wherein said valve seats and valve disks are relatively spaced along the axis of said passageway.

3. A valve for sealing a passageway comprising, in combination, a pair of valve seats in said passageway and relatively spaced along the axis of said passageway, a body portion including first and second valve disks movable into and out of engagement with respective ones of said valve seats and a flexible membrane connecting said first and second valve disks, means for moving said body portion toward and away from said seats and including a valve stem disposed within said body portion, said valve stem connected to and movable jointly with said first valve disk and movable with and relative to said second valve disk, and means connected to said stem and normally spaced from said second valve disk when said valve disks are in engagement with said seats and movable into and out of engagement with said second valve disk, and means for biasing said second disk toward engagement with a respective one of said valve members.

4. A valve for sealing a passageway comprising, in combination, at least two valve seats in said passageway and relatively spaced along the axis of said passageway, a body portion including at least two valve disks connected for relative movement into and out of engagement with respective ones of said valve seats, means for moving said body portion toward and away from said seats and connected to and movable jointly with one of said valve disks, means normally spaced from the other of said valve disks when said valve disks are in engagement with said seats and movable into and out of engagement with said other of said valve disks to move said other valve disk upon movement of said stem, and means for biasing said other of said valve disks toward engagement with its respective seat.

5. A valve for sealing a passageway comprising, in combination, a pair of valve seats in said passageway and disposed in relative spaced relationship along the axis of said passageway, a body portion including first and second resilient valve disks arranged in relative spaced relation on said axis for movement into and out of engagement with respective ones of said valve seats, said body portion also including a flexible membrane sealingly connecting said first and second valve disks, means for moving said body portion toward and away from said seats and including a valve stem extending generally along said axis and into said body portion to said axis, said valve stem engaging said first valve disk for joint movement therewith, a shoulder on said stem positioned axially intermediate said first and second disks and arranged for engagement with said second disk when said second valve disk is moving relative to said valve seats and for movement out of engagement with said second disk when said second disk is engaged with its respective valve seat so that said valve disks are moved jointly by said valve stem with respect to said valve seats and said first valve disk is moved by said valve stem relative to said second valve disk when said second valve disk is engaged with its respective seat.

6. The combination of claim 5 wherein said second disk is arranged to seat first and including means for biasing said second disk toward engagement with a respective one of said valve seats and said shoulder.

7. A valve for sealing a passageway comprising, in combination, a pair of valve seats in said passageway and relatively spaced in the direction of flow through said valve and passageway, a body portion including first and second valve disks arranged in relative spaced relation in said direction of flow for movement into and out of engagement with respective ones of said valve seats, said body portion also including a flexible membrane connecting said first and second valve disks, means for moving said body portion toward and away from said valve seats and including a valve stem disposed within said body portion and engaging said first valve disk for joint movement therewith, and means connected to and movable with said stem and arranged for engagement with said second disk when said body portion is moving with respect to said valve seats and for movement out of engagement with said second disk when said second valve disk is seated to provide relative independent movement between said valve disks to insure positive seating of both valve disks with their respective valve seats.

8. The combination of claim 7 wherein said second valve means is arranged to seat first and including means biasing said second disk toward engagement with said means on said stem.

9. A valve for sealing a passageway comprising, in combination, at least two valve seats in said passageway and relatively spaced along the axis of said passageway, a body portion including at least two valve means arranged in relative spaced relation on said axis for movement into and out of engagement with respective ones of said valve seats, said body portion including means sealingly interconnecting said valve means for relative movement therebetween, and operating means for moving said valve means toward and away from said seats and fixedly connected to and movable jointly with one of said valve disks, said operating means including means connecting said operating means to and for joint movement with the other of said valve disks when said other valve disk is spaced from its respective valve seat and disconnecting said operating means from said other valve disk when said other valve disk is seated to thereby permit movement of said one valve disk relative to said other valve disk for engagement with its respective valve seat.

References Cited by the Examiner

UNITED STATES PATENTS

| 967,820 | 8/10 | Nachtizall | 137—630.19 |
| 2,595,012 | 4/52 | Smith | 251—332 XR |
| 2,654,388 | 10/53 | Glass | 137—527.8 XR |
| 2,911,010 | 11/59 | Lamburn | 137—614.11 XR |

LAVERNE D. GEIGER, *Primary Examiner.*

ISADOR WEIL, *Examiner.*

UNITED STATES PATENT OFFICE
CERTIFICATE OF CORRECTION

Patent No. 3,194,268                                 July 13, 1965

Reno L. Vicenzi et al.

It is hereby certified that error appears in the above numbered patent requiring correction and that the said Letters Patent should read as corrected below.

Column 2, line 60, for "second" read -- first --.

Signed and sealed this 18th day of January 1966.

(SEAL)
Attest:

ERNEST W. SWIDER
Attesting Officer

EDWARD J. BRENNER
Commissioner of Patents